UNITED STATES PATENT OFFICE.

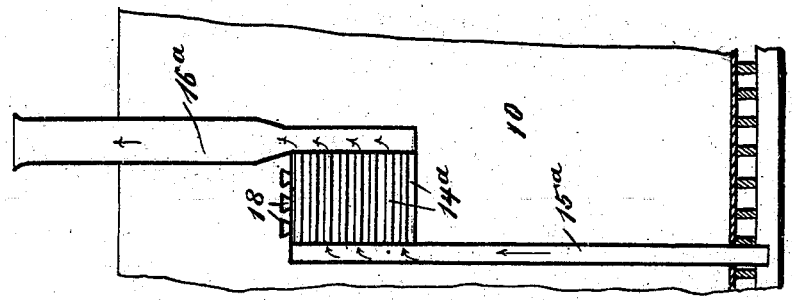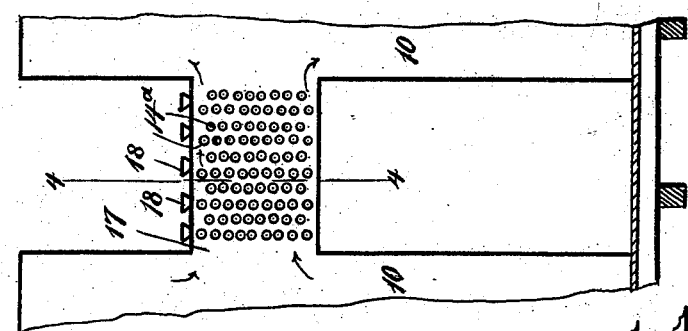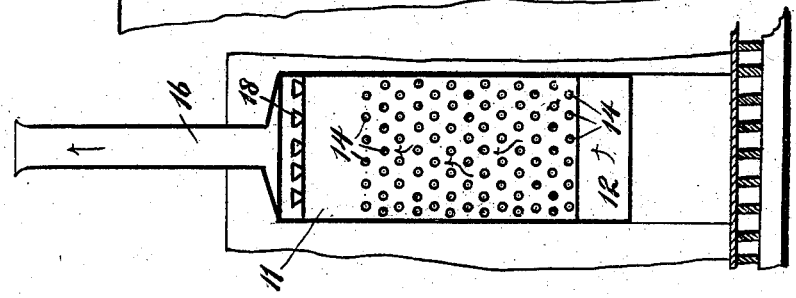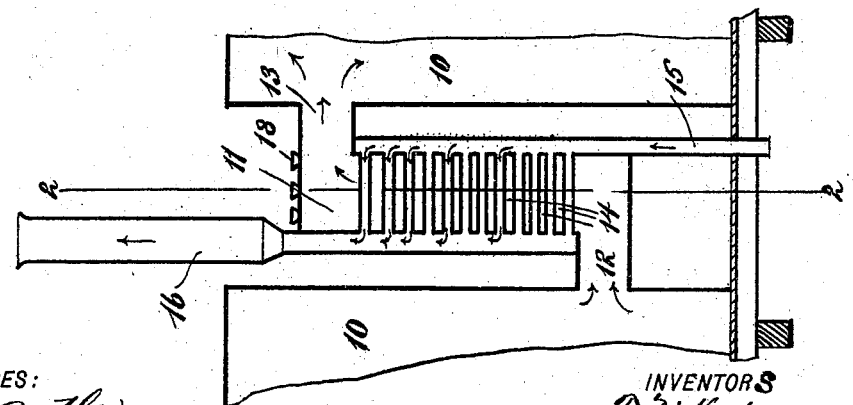

FRANCIS B. HACKER, OF CHARLESTON, SOUTH CAROLINA, AND PETER S. GILCHRIST, OF BALTIMORE, MARYLAND, ASSIGNORS TO THEMSELVES, AND ALBERT C. JOHNSON, OF BALTIMORE, MARYLAND.

APPARATUS FOR MAKING SULPHURIC ACID.

SPECIFICATION forming part of Letters Patent No. 503,847, dated August 22, 1893.

Application filed August 11, 1892. Serial No. 442,845. (No model.)

*To all whom it may concern:*

Be it known that we, FRANCIS B. HACKER, of Charleston, in the county of Charleston and State of South Carolina, and PETER S. GILCHRIST, of the city of Baltimore, Maryland, have invented a new and Improved Apparatus for the Manufacture of Sulphuric Acid, of which the following is a full, clear, and exact description.

Our invention relates to improvements in the apparatus which is used in the manufacture of sulphuric acid, and especially to the connections between the several lead chambers, the lead chambers and the Glover tower, and between the chambers and the Guy Lussac tower.

The object of our invention is to reduce the chamber space which is needed in the manufacture of acid, to increase the quantity of acid, to reduce the cost of the necessary plant, to provide for carrying off the excessive heat caused by the mixing of the gases in the formation of the sulphuric acid, and to provide for the quick and thorough mingling of the molecules of the gases as they pass from chamber to chamber.

To these ends our invention consists in certain features of construction and combinations of the same, as will be hereinafter described and claimed.

Reference is to be had to the accompanying drawings forming a part of this specification, in which similar figures of reference indicate corresponding parts in all the views.

Figure 1 is a broken sectional elevation showing a pipe or column arranged between two adjacent chambers of a sulphuric acid producing apparatus, the column being provided with cooling and mixing pipes, the column and pipes forming an essential part of our invention. Fig. 2 is a vertical section on the line 2—2 in Fig. 1. Fig. 3 is a view of a modified form of the invention in which adjacent chambers are connected by a horizontal or straight casing or passageway having a series of cross cooling and mixing pipes therein; and Fig. 4 is a section on the line 4—4 in Fig. 3.

As shown in Figs. 1 and 2, the chambers 10 which are constructed in series in the usual way, represent the ordinary lead chambers of a sulphuric acid producing apparatus, and these chambers have interposed between them an upright case or column 11 which connects with one chamber by a passage 12 at the bottom, and with the opposite chamber by a passage 13 at the top.

Leading horizontally across the case 11, between the inlet passage 12 and outlet passage 13, are a plurality of cold air pipes 14 which are not placed in regular rows but are arranged to offer an obstruction and resistance to the gases which pass upward through the case, so as to cause the quick and thorough mingling of said gases. The pipes 14 are preferably of lead and connect with an air flue 15 on one side of the case 11 and with a stack 16 on the opposite side. This arrangement provides for a natural draft of cool air through the pipes which has a tendency to lower the temperature in the case 11, but if desired, artificially cooled air may be forced through the pipes.

As shown in Figs. 3 and 4, the chambers 10 are connected by a straight or horizontal case 17 which thus forms a straight passage between them, and the passage is interrupted by numerous cross pipes 14ª like the pipes 14 already described, these pipes connecting with an air flue 15ª and with a stack 16ª.

In all the figures, from 1 to 4, are seen lutes or dishes 18 which are placed on top of the cases 11 and 17, and these lutes or dishes contain weak sulphuric acid or water which is arranged to drip downward over the pipes 14 thus reducing the temperature in the cases and supplying moisture in the form of vapor which promotes the acid process.

In the drawings we have shown the pipe case or column embodying our invention as arranged between two lead chambers 10, but it will be understood that the pipe case or column may be placed between the Glover tower and the first lead chamber of the series, and between the last lead chamber and the Guy Lussac tower.

In carrying out the invention the pipe case or column may be arranged between all the chambers or between any necessary number of them. When the pipe, column or case is used the gases, as they pass through it, are obstructed by the pipes so as to cause a quick and thorough mingling, and the air draft through the pipes, together with the moistening described above, causes a comparatively low temperature to be maintained.

Having thus described our invention, we claim as new and desire to secure by Letters Patent—

1. The combination with a sulphuric acid apparatus, of a column or case interposed therein and provided with a series of obstructing air pipes, substantially as described.

2. In a sulphuric acid apparatus, the combination with lead chambers connected together, of a series of obstructing air pipes in the connection between the said chambers, substantially as described.

3. In a sulphuric acid apparatus, the combination with lead chambers, and a case or column connecting the said chambers, of a series of pipes in the case or column, and means for supplying a current of air through the said pipes, substantially as described.

4. In a sulphuric acid apparatus, the combination with lead chambers, and a case or column connecting the said chambers, of a series of cross pipes arranged in the case or column, an air flue with which one end of the pipes connect, and a stack with which the other end of the pipes connect, substantially as described.

5. In a sulphuric acid apparatus, the combination with lead chambers, and a case or column connecting the chambers, of a series of obstructing air pipes arranged in the said case or column, and moistening lutes on the case or column and delivering upon the said pipes, substantially as described.

FRANCIS B. HACKER.
PETER S. GILCHRIST.

Witnesses to the signature of Francis B. Hacker:
JNO. S. FAIRLY,
J. W. ROBINSON.

Witnesses to the signature of Peter S. Gilchrist:
JNO. S. FAIRLY,
E. P. TOOMER.